(12) United States Patent
Tuleweit et al.

(10) Patent No.: US 6,497,094 B1
(45) Date of Patent: Dec. 24, 2002

(54) METHOD FOR MONITORING A SECONDARY AIR SYSTEM IN ASSOCIATED WITH THE EXHAUST SYSTEM OF A VEHICLE

(75) Inventors: Wilfried Tuleweit, Schwieberdingen (DE); Joerg Lange, Eberdingen (DE); Klaus Hirschmann, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,569

(22) PCT Filed: Sep. 26, 2000

(86) PCT No.: PCT/DE00/03338

§ 371 (c)(1),
(2), (4) Date: Jun. 29, 2001

(87) PCT Pub. No.: WO01/33052

PCT Pub. Date: May 10, 2001

(30) Foreign Application Priority Data

Nov. 3, 1999 (DE) .......................................... 199 52 836

(51) Int. Cl.$^7$ ................................................. F01N 3/00
(52) U.S. Cl. ............................. 60/289; 60/274; 60/290
(58) Field of Search ........................... 60/274, 289, 290

(56) References Cited

U.S. PATENT DOCUMENTS

| | | | | |
|---|---|---|---|---|
| 5,388,401 A | * | 2/1995 | Nishizawa et al. | 60/289 |
| 5,400,591 A | * | 3/1995 | Aramaki | 60/289 |
| 5,526,642 A | * | 6/1996 | Dambach et al. | 60/289 |
| 5,560,199 A | * | 10/1996 | Agustin et al. | 60/289 |
| 5,706,653 A | * | 1/1998 | Shoji et al. | 60/289 |
| 5,743,085 A | * | 4/1998 | Takaku et al. | 60/289 |
| 5,782,086 A | * | 7/1998 | Kato et al. | 60/289 |
| 5,822,976 A | * | 10/1998 | Cockerill | 60/290 |
| 5,852,929 A | * | 12/1998 | Kato et al. | 60/289 |
| 5,921,077 A | * | 7/1999 | Bayerle et al. | 60/289 |
| 6,044,643 A | * | 4/2000 | Ittner et al. | 60/289 |
| 6,155,043 A | * | 12/2000 | Zhang et al. | 60/289 |

FOREIGN PATENT DOCUMENTS

| | | |
|---|---|---|
| DE | 43 43 639 | 6/1995 |
| FR | 2726031 | 4/1996 |

* cited by examiner

Primary Examiner—Thomas Denion
Assistant Examiner—Diem Tran
(74) Attorney, Agent, or Firm—Walter Ottesen

(57) ABSTRACT

A method for monitoring a secondary air system in combination with the exhaust-gas system of a motor vehicle is described. The method includes the steps of: providing a probe downstream of the junction of a secondary air line into the exhaust-gas channel; obtaining an air/fuel ratio ($\lambda_{exhaust\ gas}$) utilizing the probe; obtaining a signal for the intake air flow ($mass_{intake\ air}$); arithmetically determining the secondary air mass ($mass_{secondary\ air}$) in dependence upon (a) the ratio of intake air flow to fuel ($\lambda_{engine}$), which is metered per unit of time; (b) the air/fuel ratio ($\lambda_{exhaust\ gas}$); and, (c) the signal for the intake air flow ($mass_{intake\ air}$); and, evaluating the operability of the secondary air system in dependence upon the secondary air mass ($mass_{secondary\ air}$).

14 Claims, 3 Drawing Sheets

Fig.1 (State of the Art)

METHOD FOR MONITORING A SECONDARY AIR SYSTEM IN ASSOCIATED WITH THE EXHAUST SYSTEM OF A VEHICLE

FIELD OF THE INVENTION

The invention relates to a method for monitoring a secondary air system in combination with the exhaust-gas system of a motor vehicle.

BACKGROUND OF THE INVENTION

A method of this kind and an arrangement for carrying out the method are known from U.S. Pat. No. 5,542,292. With this known method, the operability of the secondary air system can be checked but it is not possible to determine the secondary air mass actually supplied to the exhaust-gas system. All emission relevant components and systems of controls for internal combustion engines must be able to be diagnosed in the context of the on-board diagnosis (OBD) required by the American authorities and which is intended to also take effect in Europe starting Jan. 1, 2000. Here, the quantitative determination of the actual secondary air mass is also required.

SUMMARY OF THE INVENTION

The invention is based on the task of further improving a method for monitoring a secondary air system in combination with the exhaust-gas system of a motor vehicle of the generic type in such a manner that the secondary air mass, which is actually supplied to the exhaust-gas system, can be determined without an additional sensor, for example, an air mass sensor or the like, being required.

In the method according to the invention, the operability of the secondary air mass system is evaluated on the basis of the arithmetically determined secondary air mass flow. An advantage of the invention is that the secondary air mass can be determined without an additional sensor because the signals, which are necessary for the determination of the secondary air mass, are either anyway available or can be formed from signals which are anyway available.

The secondary air mass can be determined with a continuous $\lambda$-probe as well as with a two-point $\lambda$-probe.

A valve tightness check of the secondary air mass cutoff valve and an offset measurement to determine the secondary air mass offset when the secondary air pump is switched off are the subject matter of advantageous additional embodiments of the method.

The diagnosis takes place in a pregiven air mass window and engine temperature window in order to exclude malfunctions during the measurement phases. Transient influences are substantially eliminated by suppression and a lowpass filtering of the measurement results.

BRIEF DESCRIPTION OF THE DRAWINGS

The invention will be explained in the following with reference to the embodiments shown in the drawing.

DESCRIPTION OF THE PREFERRED EMBODIMENTS OF THE INVENTION

One can blow fresh air into the exhaust-gas channel between engine and catalytic converter in order to bring the catalytic converter in the exhaust-gas channel of the engine to the operating temperature as rapidly as possible. In this way, an exothermal reaction takes place between the exhaust gas and the blown-in fresh air in the exhaust-gas channel and/or in the catalytic converter whereby an accelerated heat-up of the catalytic converter results. A warmup of the catalytic converter to its operating temperature as rapidly as possible is strived for in the sense of a least possible emission of toxic substances. For this reason, it is important that the secondary air system, which blows the fresh air into the exhaust-gas channel, operates properly. The basic idea of the invention is to evaluate the operability of the secondary air system based on the air mass flow generated by the secondary air system. Here, a sensor for detecting the secondary air flow is done without. Rather, the real or actual secondary air mass is determined from variables known anyway in the manner described hereinafter.

Figure 1:
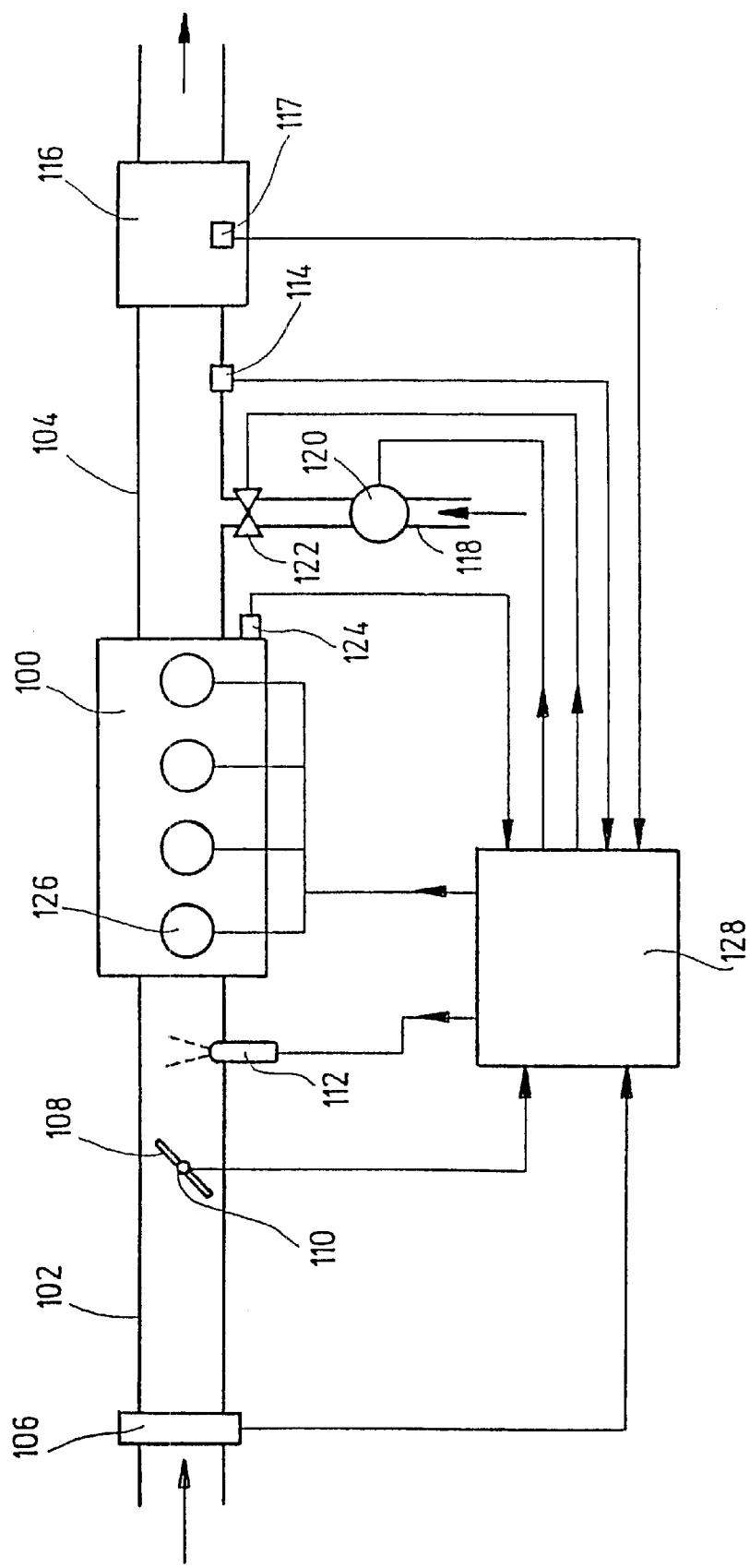
FIG. 1 shows a schematic representation of an internal combustion engine having a secondary air system as known from the state of the art and which is monitored with the method according to the invention.

FIG. 1 shows an internal combustion engine 100 which is equipped with a secondary air system. An air/fuel mixture is supplied to the engine 100 via an intake system 102 and the exhaust gases are discharged into an exhaust-gas channel 104. The following are mounted in the intake system 102 viewed in the flow direction of the intake air: an air quantity sensor or air mass sensor 106, for example, a hot-film air mass sensor; a throttle flap 108 having a sensor 110 for detecting the opening angle of the throttle flap 108; and, at least one injection nozzle 112. An oxygen sensor 114 and a catalytic converter 116 having a temperature sensor 117 are mounted in the exhaust-gas channel 104 viewed in the flow direction of the exhaust gas. A secondary air line 118 opens into the exhaust-gas channel 104 upstream of the oxygen sensor 114. Fresh air can be blown into the exhaust-gas channel 104 through the secondary air line 118 by means of a secondary air pump 120. A valve 122 is mounted between the secondary air pump 120 and the junction of the secondary air line 118. The valve 122 is, for example, required in order to seal off the exhaust-gas channel 104 when the secondary air pump 120 is shut off. Furthermore, the valve 122 can be used for the purpose of influencing the secondary air flow.

An rpm sensor 124 is provided at the engine 100.

Furthermore, the engine 100 includes, for example, four spark plugs 126 for igniting the air/fuel mixture in the cylinders. The output signals of the air quantity sensor or air mass sensor 106, the sensor 110 for detecting the opening angle of the throttle flap 108, the oxygen sensor 114, the temperature sensor 117 and the rpm sensor 124 are all supplied via corresponding connecting lines to the central control apparatus 128. The central control apparatus 128 evaluates the sensor signals and controls the following via further connecting lines: the injection nozzle or injection nozzles 112, the secondary air pump 120, the valve 122 and the spark plugs 126.

When using a continuous oxygen sensor ($\lambda$-probe) 114, the secondary air thinning can be directly determined from the probe signal $\lambda_{exhaust\ gas}$ measured by the oxygen sensor 114 when utilizing a continuous oxygen sensor ($\lambda$-probe) during the secondary air phase, that is, during the time in which the secondary air is blown into the exhaust-gas channel 104. A conversion to the actual secondary air mass can take place in accordance with the following equation when the intake air mass "$\text{mass}_{intake\ air}$" and the ratio of the intake flow to the fuel (enrichment) metered per unit time are known:

$$\lambda_{exhaust\ gas} = \lambda_{engine} * (1 + (\text{mass}_{secondary\ air}/\text{mass}_{intake\ air})).$$

A diagnosis takes place in this context by making a comparison to a pregiven secondary air mass threshold.

Figure 2:
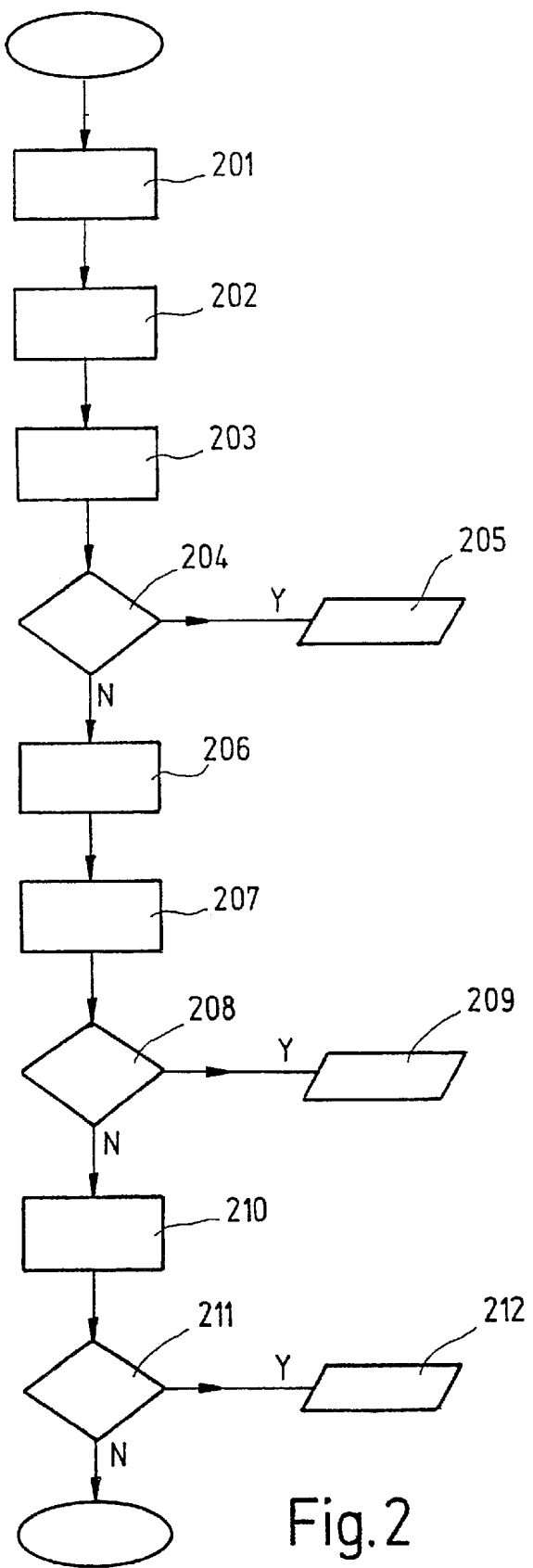
FIG. 2 shows a flowchart of an embodiment of the method according to the invention; and, FIG. 3 shows a flowchart of a further embodiment of the method according to the invention.

An embodiment of a method for monitoring the operability of the secondary air system is shown in FIG. 2.

In step 201, the intake air mass "$\text{mass}_{intake\ air}$" is detected by the air quantity sensor or the air mass sensor 106.

Thereafter, in a step 202, the previously determined desired secondary air mass "$\text{mass}_{secondary\ air\ desired}$" is determined, for example, from a family of characteristic lines and the actuating quantity of the continuous λ-controller is determined in step 203. The lambda control provides a mean control factor $FR_m$.

The actual secondary air mass or the really blown in secondary air mass "$\text{mass}_{secondary\ air\ actual}$" is determined in step 204 in accordance with the following formula:

$$\text{mass}_{secondary\ air\ actual} = ((\lambda_{exhaust\ gas}/\lambda_{exhaust\ gas\ desired} * FR_m) - 1) * \text{mass}_{intake\ air},$$

wherein: $\lambda_{exhaust\ gas\ desired}$ is a computed desired value of the λ-control.

A valve tightness check follows first after the secondary air phase. For this purpose, in a step 206, the valve 122 is first closed. The secondary air pump 120 operates in this case against the closed valve 122. A leak of the valve 122, however, leads to a blow-in of secondary air into the exhaust-gas channel 104 which likewise can be determined from the actuating quantity $FR_m$ of the λ-controller in accordance with the above formula. In this case, the value zero is assumed as the desired secondary air mass "$\text{mass}_{secondary\ air\ desired}$" whereupon the following results:

$$\text{mass}_{secondary\ air\ valve} = \text{mass}_{intake\ air} \times (FR_m - 1).$$

In step 207, the $\text{mass}_{secondary\ air\ valve}$ is arithmetically determined according to this formula.

Because of the active secondary air pump 120, a higher air mass flow arises for a valve leak than for a pure self suction effect of the leaking valve. The valve check is, however, only possible with such valves which are not opened by the pressure generated by the secondary air pump 120.

After the valve tightness check, a determination of the secondary air mass offset (which takes place in correspondence to the valve tightness check) takes place because the actuating quantity $FR_m$ of the λ-controller not only is dependent upon the actual secondary air mass "$\text{mass}_{secondary\ air\ actual}$" during the secondary air phase but is also directly dependent upon $\lambda_{engine}$ and the fuel metering. A fuel adaptation, which is not settled, would accordingly be interpreted as a secondary air mass. For these reasons, a zero-point determination as a secondary air mass offset takes place after the valve tightness check after the secondary air pump 120 is also switched off and the secondary air is removed from the exhaust-gas channel 104. The above secondary air masses, which are determined in steps 203 and 207, are referred to this secondary air mass offset (step 210).

To preclude a malfunction during the measurement phases, the measurements take place only in a pregiven air mass window and engine temperature window. Influences based on transient behavior are additionally eliminated by a lowpass (PT1-) filtering of the measurement results.

The diagnosis now takes place in the following manner.

An inadequately blown-in secondary air mass is detected when the determined actual secondary air mass ($\text{mass}_{secondary\ air\ actual}$) drops below a pregiven threshold (step 204). If this is the case, a fault announcement is outputted (step 205) or stored.

An untight secondary cutoff valve 122 is detected when the secondary air valve mass "$\text{mass}_{secondary\ air\ valve}$" exceeds a pregiven threshold. Accordingly, $\text{mass}_{secondary\ air}$ is compared to the threshold in step 208. When the threshold is exceeded, a fault announcement is, in turn, outputted (step 209) or stored.

If the offset amount is detected during the determination of the secondary air mass offset as being excessive, that means, the offset amount exceeds a further pregiven threshold value (which is checked in step 211), then a fault is likewise present which is outputted or stored in step 212. The allocation is, however, not clear because a leaky secondary air valve 122, other leaks in the intake system 102 or in the exhaust-gas channel 104 or even a fault of the fuel supply can be present.

An advantageous embodiment of the above-described method provides that, for the input of the engine enrichment in dependence upon the secondary air mass, the determined real secondary air mass or actual secondary air mass "$\text{mass}_{secondary\ air\ actual}$" can be used for the adaptation of the assumed secondary air mass "$\text{mass}_{secondary\ air\ desired}$". In this way, a substantially improved control of the engine in combination with secondary air is possible wherein the secondary air tolerances can be compensated by adapting the enrichment of the engine. In contrast, the direct correction of the secondary air mass is possible for engines having a variable secondary air mass.

A great advantage of the above-described method is also that a quantitative diagnosis of the secondary air mass without exhaust-gas disadvantages is possible already during the secondary air phase because of the use of the continuous λ-probe. An additional switch-on of the secondary air system for diagnostic purposes is not required as known in the state of the art.

Figure 3:
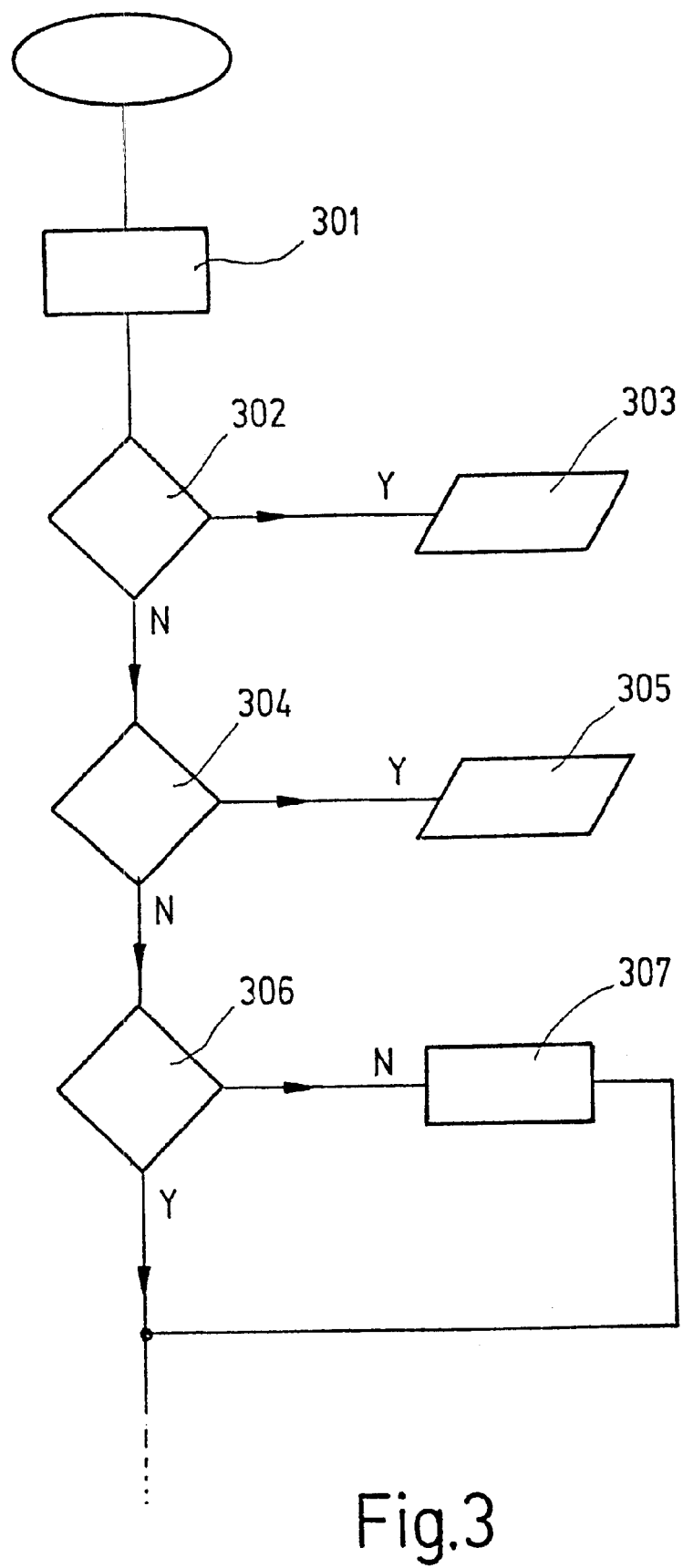

Subsequently, and in combination with FIG. 3, the determination of the real or actual secondary air mass "$\text{mass}_{secondary\ air\ actual}$" is described for a two-point λ control.

First, as described above (steps 201 to 203), the intake air mass ($\text{mass}_{intake\ air}$), the desired secondary air mass ($\text{mass}_{secondary\ air\ desired}$) and the desired quantity $FR_m$ of the λ-controller are determined. Furthermore, $\lambda_{exhaust\ gas\ desired}$ is first arithmetically determined in a manner known per se as a ratio of intake air flow to fuel metered per unit of time.

During the secondary air phase, the λ-control is operated in the so-called "rich-protective mode" which means that the actuating quantity $FR_m$ is limited to 1. Stated otherwise, the λ-control may not enrich the air/fuel ratio notwithstanding the lean probe signal of the oxygen probe 114; instead, the λ-control may only make more lean. Expressed otherwise, the λ-control may not control away the secondary air thinning. When the oxygen probe 114, in contrast, detects a rich air/fuel ratio, there is a control to at least λ=1 in the exhaust gas. The actuating quantity ($FR_m < 1$) of the λ-control which results herefrom serves, in this case, to arithmetically determine (step 301) the actual secondary air mass "$\text{air}_{secondary\ air\ actual}$" in accordance with the following equation:

$$\text{mass}_{secondary\ air\ actual} = FR_m * 1/\lambda_{exhaust\ gas\ desired} * (\text{mass}_{intake\ air} + \text{mass}_{secondary\ air\ desired}) - \text{mass}_{intake\ air}.$$

The actual secondary air mass is determined in a pregiven air mass window and temperature window and is filtered by means of a lowpass(PT1)-filter in order to eliminate transient effects. If the arithmetically determined ratio $\lambda_{exhaust}$ gas desired of intake air flow to fuel, which is metered per unit of time, is not known, the actual secondary air mass can be determined with the following equation:

$$mass_{secondary\ air\ actual} = FR_m/\lambda_{exhaust\ gas\ desired} *(mass_{intake\ air} + mass_{secondary\ air\ desired}) - mass_{intake\ air}.$$

Alternatively, the actual secondary air mass can also be formed from the actuating quantity $FR_m < 1$ of the $\lambda$-controller via a time measurement or an integration.

The diagnosis takes place via a comparison to pregiven secondary air thresholds.

In step 306, a check is made as to whether the actual secondary air mass lies above a third threshold. If this is the case, the system works properly because enough secondary air is blown in (the $\lambda$-control only had to lean negligibly).

If the actual secondary air mass lies below a first threshold (step 302), no secondary air at all could be introduced. This means that the secondary air valve was not open or the secondary air channel was clogged. A fault announcement is outputted (step 303) or stored.

If, in contrast, the actual secondary air mass is below a second threshold (which is checked in step 304), then there was not sufficient secondary air blown in. An automatic induction took place through the opened valve 122 and a secondary air thinning was determined. From this, it can be derived that the secondary air pump 120 did not supply a sufficient air flow but that valve 122 was open. This leads to a fault announcement (step 305) or to storage of a fault entry.

If, in contrast, the actual secondary air mass lies between the first and second thresholds, then a secondary adaptation (step 307) can be carried out wherein, above an intake air mass threshold, a control to $\lambda=1$ is made in the exhaust gas. This adaptation phase is so configured that the adaptation phase takes place during the actual blowing in of secondary air, the secondary air phase is extended or later, for an operationally warm engine, is carried out by a renewed driving of the secondary air system. The determination of the actual secondary air mass takes place during this adaptation phase in accordance with the following equation:

$$mass_{secondary\ air\ actual} = FR_m *(mass_{intake\ air} + mass_{secondary\ air\ desired}) - mass_{intake\ air}.$$

After the secondary air phase, a valve tightness check is first made (see steps 206 to 209 above) and, thereafter, an offset measurement (see steps 210 to 212 above) is carried out as described above.

What is claimed is:

1. A method for monitoring a secondary air system in combination with the exhaust-gas system of a motor vehicle, the method comprising the steps of:

providing a probe downstream of the junction of a secondary air line into the exhaust-gas channel;

obtaining an air/fuel ratio ($\lambda_{exhaust\ gas}$) utilizing said probe;

obtaining a signal for the intake air flow ($mass_{intake\ air}$);

arithmetically determining the secondary air mass ($mass_{secondary\ air}$) in dependence upon:

(a) the ratio of intake air flow to fuel ($\lambda_{engine}$), which is metered per unit of time;

(b) said air/fuel ratio ($\lambda_{exhaust\ gas}$) obtained from said probe;

(c) said signal for the intake air flow ($mass_{intake\ air}$); and, (d) in accordance with the following equation:

$$\lambda_{exhaust\ gas} = \lambda_{engine} *(1 + (mass_{secondary\ air}/mass_{intake\ air}));$$

evaluating the operability of said secondary air system in dependence upon said secondary air mass ($mass_{secondary\ air}$);

determining said secondary air mass ($mass_{secondary\ air}$) during the secondary air phase; and, determining the secondary air actual mass ($mass_{secondary\ air\ actual}$) in dependence upon an actuating quantity ($FR_m$) of a $\lambda$-controller.

2. The method of claim 1, comprising the further step of evaluating said secondary air system as being operable when the secondary air mass exceeds a pregiven threshold value.

3. A method for monitoring a secondary air system in combination with the exhaust-gas system of a motor vehicle, the method comprising the steps of:

providing a probe downstream of the junction of a secondary air line into the exhaust-gas channel;

obtaining an air/fuel ratio ($\lambda_{exhaust\ gas}$) utilizing said probe;

obtaining a signal for the intake air flow ($mass_{intake\ air}$);

arithmetically determining the secondary air mass ($mass_{secondary\ air}$) in dependence upon:

(a) the ratio of intake air flow to fuel ($\lambda_{engine}$) which is metered per unit of time;

(b) said air/fuel ratio ($\lambda_{exhaust\ gas}$) obtained from said probe; and, (c) said signal for the intake air flow ($mass_{intake\ air}$); and, evaluating the operability of said secondary air system in dependence upon said secondary air mass ($mass_{secondary\ air}$);

determining said secondary air mass ($mass_{secondary\ air}$) during the secondary air phase; and, determining the secondary air actual mass ($mass_{secondary\ air\ actual}$) in dependence upon an actuating quantity ($FR_m$) of a $\lambda$-controller.

4. The method of claim 3, comprising the further step of determining the secondary air actual mass ($mass_{secondary\ air\ actual}$) in accordance with the following equation:

$$mass_{secondary\ air\ actual} = ((\lambda_{exhaust\ gas}/\lambda_{exhaust\ gas\ desired} *FR_m) - 1)*mass_{intake\ air},$$

wherein $\lambda_{exhaust\ gas}$ desired is the air/fuel ratio to be adjusted.

5. The method of claim 4, comprising the further step of using said secondary air actual mass ($mass_{secondary\ air\ actual}$) at a pregiven ratio of intake air flow to fuel ($\lambda_{engine}$) metered per unit of time for the adaptation of the secondary air desired mass ($mass_{secondary\ air\ desired}$) determined based on a model.

6. The method of claim 1, comprising the further step of computing the secondary air actual mass ($mass_{secondary\ air\ actual}$) during the secondary air phase in dependence upon an actuating quantity ($FR_m$) of a $\lambda$-controller and in dependence upon a secondary air desired mass ($mass_{secondary\ air\ desired}$), which is determined via a model, and in dependence upon the desired value of an arithmetically determined ratio of intake air flow to fuel ($\lambda_{exhaust\ gas\ desired}$) measured per unit of time; and, wherein the actuating quantity ($FR_m$) is limited to 1.

7. The method of claim 5, comprising the further step of computing the secondary air actual mass ($mass_{secondary\ air\ actual}$) in accordance with the following equation:

$$mass_{secondary\ air\ actual} = FR_m *1/\lambda_{exhaust\ gas\ desired} *(mass_{intake\ air} + mass_{secondary\ air\ desired}) - mass_{intake\ air}.$$

8. The method of claim 7, comprising the further step of evaluating said secondary air system as being operational when the secondary air mass exceeds a pregiven threshold value.

9. The method of claim 1, wherein: after the secondary air phase, with a closed secondary air cutoff valve and a switched on secondary air pump, the secondary air mass is arithmetically determined in accordance with the formula below and the operability of the secondary air cutoff valve is evaluated based on the secondary air mass so determined:

$$\text{mass}_{secondary\ air\ valve} = \text{mass}_{intake\ air} * (FR_m - 1).$$

10. The method of claim 9, comprising the further step of evaluating the secondary air cutoff valve as being leaky when the secondary air mass ($\text{mass}_{secondary\ air\ valve}$) exceeds a pregiven threshold.

11. The method of claim 1, wherein, after the valve tightness check, a determination of the secondary air mass offset takes place in that one switches off the secondary air pump and, after a pregivable time interval, the secondary air mass is determined and this is taken as offset signal and evaluated.

12. The method of claim 11, comprising the further step of outputting a fault signal when the secondary air mass, which is determined as an offset, exceeds a pregiven threshold value.

13. The method of claim 1, wherein the determination of the intake air mass ($\text{mass}_{intake\ air}$) and the air/fuel ratio ($\lambda_{exhaust\ gas}$), which is detected by the probe, take place in a pregivable air mass range and temperature range of the internal combustion engine.

14. The method of claim 13, wherein the measured values are lowpass filtered.

* * * * *